G. KOLP.
DANCING CHART AND METHOD OF SELF INSTRUCTION.
APPLICATION FILED DEC. 6, 1907.

No. 900,105.

Patented Oct. 6, 1908.

Witnesses:

Inventor:
Gertrude Kolp,
By Robert W. Randle,
Attorney.

UNITED STATES PATENT OFFICE.

GERTRUDE KOLP, OF RICHMOND, INDIANA.

DANCING-CHART AND METHOD OF SELF-INSTRUCTION.

No. 900,105.   Specification of Letters Patent.   Patented Oct. 6, 1908.

Application filed December 6, 1907. Serial No. 405,333.

*To all whom it may concern:*

Be it known that I, GERTRUDE KOLP, a citizen of the United States, residing in the city of Richmond, in the county of Wayne and State of Indiana, have invented certain new and useful Improvements in Dancing-Charts and Methods of Self-Instruction, of which the following is a full, clear, and accurate specification and exposition, being such as will enable others to use the same with absolute exactitude.

The object of this my present invention, broadly speaking, is the provision of a simple and inexpensive dancing chart and method of self instruction, by the use of which the several movements of a dance may be acquired with ease and with absolute exactitude. In this instance your orator has shown and described the essential and necessary parts and instructions for two dances: a "square two-step" and a "square waltz".

In the accompanying drawings, forming a part of this specification, I have shown, in reduced form, the necessary charts for instruction in the two dances named, in which—

Figure 1:
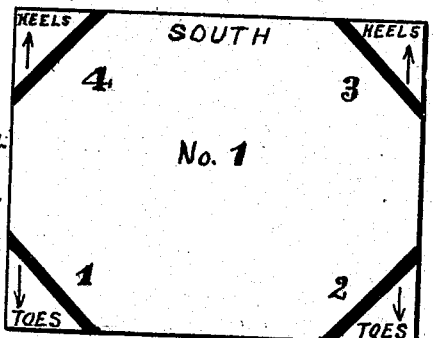
Figure 2:
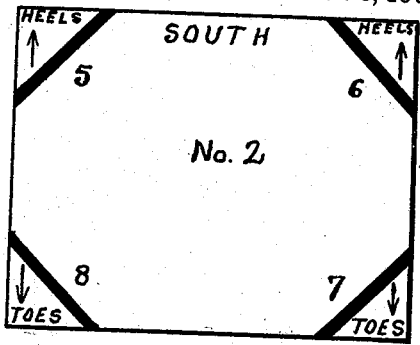
Figure 3:
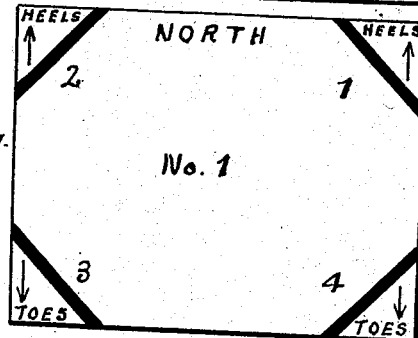
Figure 4:
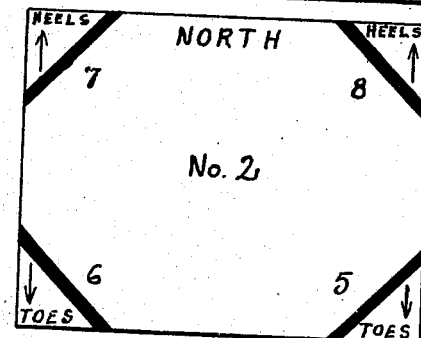
Figure 5:
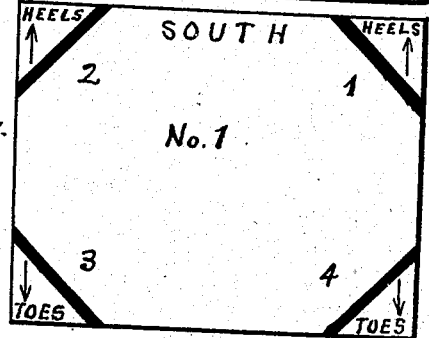
Figure 6:
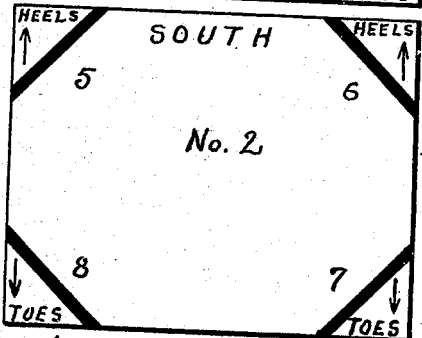
Figure 7:
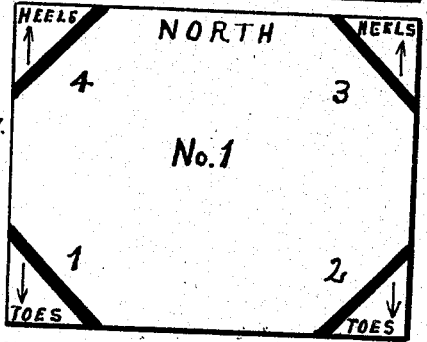
Figure 8:
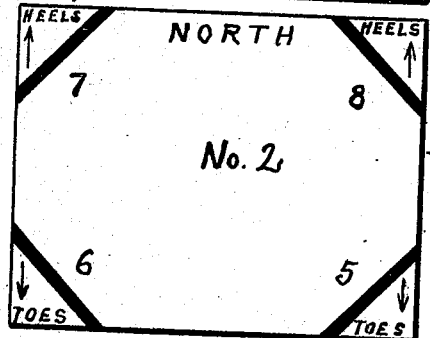

Figure 1 shows part No. 1, for lady, of the square two-step chart; Fig. 2 shows part No. 2, for the lady, of the square two-step chart; Fig. 3 shows part No. 1, for the gentleman, of the square two-step chart; Fig. 4 shows part No. 2, for the gentleman, of the square two-step chart. Fig. 5 shows part No. 1, for the lady, of the square waltz chart; Fig. 6 shows part No. 2, for the lady, of the square waltz chart; Fig. 7 shows part No. 1, for the gentleman, of the square waltz chart; and Fig. 8 shows part No. 2, for the gentleman, of the square waltz chart.

The four corners of each chart are divided out by a solid-line, each corner being designated by a word, as "Heels" or "Toes", accompanied by an arrow, denoting the position to be assumed by the student. In the center of each chart is a number denoting the number of the chart. And near each corner of each of the charts is a numeral by which the several movements to be taken are specifically referred to in the directions.

The charts herein shown are considerably reduced in size from that used in practice, the actual size of each chart I have determined should, for convenience, be about 8x10 inches. Each of the charts should be a separate entity, and may be formed of rather stiff card-board.

I will now describe, as briefly as I may, the several parts and the several movements to be performed by the student in the two dances above referred to, which I will take up in progressive succession.

Square Two-Step.

*Part for lady.—Lesson I.—*This step is danced to $\frac{2}{4}$ time. Place chart No. 1, shown in Fig. 1, flat upon the floor with the top thereof to the south, as denoted by the word "South" at the top of the chart. The pupil is to stand with her toes together within four inches of the chart with the arrow in the lower left-hand corner of the chart pointing between her toes, the pupil facing south. Now slide the right foot across to numeral 2 (Fig. 1) keeping within four inches of chart. Bring left foot to numeral 2, resting weight of body on left foot, and then step forward with right foot to numeral 3. Lift left foot up and slide with left foot across from numeral 3 to numeral 4. Bring right foot up to numeral 4, resting weight on right foot, and step backwards with left foot to numeral 1 (near corner). Lift right foot up and slide with right foot again from numeral 1 to numeral 2. The above operations should be repeated many times. When practicing these steps always keep four inches outside of the chart with the right and left foot, this gives one the proper length of the step. Notice that you are each time stepping forward with the right foot and backward with the left foot. The above movements are the foundation of the two-step dance. Count by saying:

Slide ... and ... step ... slide ... and ... step
1 ... and ... 2 ... 3 ... and ... 4 which makes the four counts. When making the slide across the chart, repeat the word "slide" or "1". When the foot is brought up to rest, repeat the word "and". When stepping forward or backward, repeat the word "step" or "2", and you have the count, "slide ... and ... step". The above movements should be repeated until the student can perform the several operations without the aid of the chart.

*Square two-step. Part for lady.—Lesson II.—*"The turn:" In the turn the chart must be removed. Assume the same position as in Lesson I: facing the south. Slide the right foot across to the side (west). Bring the left foot up and rest weight on the left foot and step forward with the right foot. Now turn slightly toward the west, lifting the left foot, and slide with the left foot across to the side (south). Bring the right foot up and rest weight on the right foot, and step backward with the left foot. Turn slightly toward the north, lifting the right foot, and slide with the right foot across to the side (east). Bring the left foot up and rest weight on the left foot, and step forward with the right foot. Turn slightly toward the east, lifting the left foot, and slide with the left foot across to the side (north). Bring the right foot up and rest weight on the right foot, and step backward with the left foot. Turn slightly toward the south, which beings you back to first position. Start again by sliding with the right foot, and repeat this same movement many times. Notice that the foot making the slide makes the step also, and that you are always, as in Lesson I, stepping forward with the right foot and backward with the left foot. In counting for this turn, count by saying:

1 . . . and . . . 2   3 . . . and . . . 4
    5 . . . and . . . 6   7 . . . and . . . 8

In practicing this lesson, it is necessary, at first, in learning the turn, to use the eight counts, but as you become familiar with the step and the proper direction in which to turn, you will find that almost a complete turn can be made in four counts. Later on this should be practiced, as only four counts are used in the dance on the turn, viz: slide to the side with the right foot and step forward with the right foot. Slide to the side with the left foot and step backward with the left foot.

*Square two-step.—Part for lady.—Lesson III.*—"The reverse step". The reverse step takes you over the floor in the dance. It is also called the guiding step, for with it your partner guides you over the floor and through the crowd of dancers. Place chart No. 1 (Fig. 1) on the floor, as in Lesson I, and place chart No. 2 (Fig. 2) about twelve inches south of it. The student is facing the south throughout this step. Stand in same position as at first, with toes together at numeral 1 (Fig. 1). Slide right foot across to numeral 2. Bring left foot up to numeral 2, resting weight on left foot, and step forward with right foot to numeral 3. Slide left foot across from numeral 3 to numeral 4. Bring right foot up to numeral 4, resting weight on right foot, and step forward with left foot to numeral 5 (Fig. 2). Slide right foot across from numeral 5 to numeral 6. Bring left foot up to numeral 6, resting weight on left foot, and step backward with right foot to numeral 7. Slide left foot across from numeral 7 to numeral 8. Bring right foot up to numeral 8, resting weight on right foot, and step backward with left foot to numeral 1.

Notice that you are sliding to the side with the right foot and stepping forward with the right foot, sliding to the side with the left foot and stepping forward with the left foot. This takes four counts and completes the "reverse step" forward. The sliding to the side with the right foot and stepping backward with the right foot, sliding to the side with the left foot and stepping backward with the left foot, which again takes four counts, and completes the "reverse step" backward.

*Square two-step.—Part for lady.—Lesson IV.*—1st. Turn with partner . . . 4 counts. 2d. Forward (reverse step), 4 counts. 3d. Backward (reverse step), 4 counts, and repeat. This is the two-step complete. In other words, the lady's part is: turn . . . forward . . . backward.

*Square two-step.—Part for gentleman.— Lesson I.*—To be danced to $\frac{2}{4}$ time. Student facing the north, as indicated by the word "North" located at the top of charts No. 1 and No. 2, Figs. 3 and 4. Place chart No. 1 (Fig. 3) flat upon the floor. Stand with heels together within four inches of chart No. 1 (Fig. 3), the arrow pointing between the heels. Slide left foot across to numeral 2, keeping within four inches of the chart. Bring right foot up to numeral 2, resting weight on right foot, and step backward with left foot to numeral 3. Lift right foot up and slide with right foot across from numeral 3 to numeral 4. Bring left foot up to numeral 4, resting weight on left foot, and step forward with right foot to numeral 1. Lift left foot up and slide with left foot from numeral 1 to numeral 2. When practicing these steps always keep four inches outside of the chart with the right and left foot. This gives you the proper length of the step in the dance. Notice that you are each time stepping backward with the left foot and forward with the right foot. Count by saying:

Slide . . . and . . . step . . . slide . . . and . . . step
    1 . . . and . . . 2 . . . 3 . . . and . . . 4 which makes the four counts. When making the slide across the chart, repeat the word "slide" or "1". When the foot is brought up to rest, repeat the word "and". When stepping backward and forward, repeat the word "step" or "2", and you have the count, "slide . . . and . . . step".

*Square two-step.—Part for gentleman.— Lesson II.*—"The turn:" In the turn the chart must be removed. Assume the same position as in Lesson I, viz: facing the north. Slide the left foot across to the side (west). Bring the right foot up and rest weight on the right foot and step backward with the left foot. Now turn slightly toward the east, lifting the right foot, and slide with the right foot across to the side (south). Bring the left foot up and rest weight on the left foot, and step forward with the right foot.

Turn slightly toward the south, lifting the left foot, and slide with the left foot across to the side (east). Bring the right foot up and rest weight on the right foot, and step backward with the left foot. Turn slightly toward the west, lifting the right foot, and slide with the right foot across to the side (north). Bring the left foot up and rest weight on the left foot, and step forward with the right foot. Turn slightly toward the north, which brings you back to first position. Start again by sliding with the left foot, and repeat as before. Notice that the foot making the slide makes the step also, and that you are always, in this as in the preceding lesson, stepping backward with the left foot and forward with the right foot. In counting for this turn, count by saying:

1 . . . and . . . 2   3 . . . and . . . 4
5 . . . and . . . 6   7 . . . and . . . 8

This practice is made in eight counts, but later this may be done in only four counts, viz: slide to the side with the left foot and step backward with the left foot. Slide to the side with the right foot and step forward with the right foot.

*Square two-step.—Part for gentleman.— Lesson III.*—"The reverse step". The reverse step takes you over the floor in the dance. It is also called the guiding step, for with it you guide your partner over the floor and through the crowd of dancers. Place chart No. 1 (Fig. 3) on the floor as in the preceding Lesson I, and place chart No. 2 (Fig. 4) about twelve inches south of it. You face the north throughout this step. Stand in same position as at first, with heels together at numeral 1 (Fig. 3). Slide left foot across to numeral 2. Bring right foot to numeral 2, resting weight on right foot, and step backward with left foot to numeral 3. Slide right foot across from numeral 3 and numeral 4. Bring left foot up to numeral 4, resting weight on left foot, and step backward with right foot to numeral 5. Slide left foot across from numeral 5 and numeral 6. Bring right foot up to numeral 6, resting weight on right foot, and step forward with left foot to numeral 7. Slide right foot across from numeral 7 to numeral 8. Bring left foot up to numeral 8, resting weight on left foot, and step forward with right foot to numeral 1. Notice that you are sliding to the side with the left foot and stepping backward with the left foot, sliding to the side with the right foot and stepping backward with the right foot. This takes four counts and completes the "reverse step" backward. The sliding to the side with the left foot and stepping forward with the left foot, sliding to the side with the right foot and stepping forward with the right foot, which again takes four counts, and completes the "reverse step" forward.

*Square two-step.—Part for gentleman.— Lesson IV.*—1st. Turn with partner . . . 4 counts. 2d. Backward (reverse step), 4 counts. 3d. Forward (reverse step), 4 counts, and repeat. This is the two-step complete. In other words, the gentleman's part is: turn . . . backward . . . forward. The gentleman must, at all times, go backward on the reverse step first, before he sends the lady backward.

Square Waltz.

*Part for lady.—Lesson I.*—The waltz is danced to ¾ time. Place chart No. 1 (Fig. 5) flat upon the floor. Stand with toes together within four inches of the chart at numeral 4, facing the south, the arrow pointing between the toes. Step forward to numeral 1 with the right foot, keeping within four inches of the chart . . . count 1. Lift left foot up and slide with left foot across from numeral 1 to numeral 2 . . . count 2. Bring right foot up to numeral 2, resting weight on right foot . . . count 3. Step backward with left foot to numeral 3 . . . count 4. Lift right foot up and slide with right foot across from numeral 3 to numeral 4 . . . count 5. Bring left foot up to numeral 4 and rest . . . count 6. Repeat until familiar with the movements. When practicing these steps, always keep four inches outside of the chart with the right and left foot; later the length of the step can be made to suit the convenience of the dancer. Count by saying:

1 . . . 2 . . . 3   4 . . . 5 . . . 6.

When making the step repeat the word "one" or "four". When making the slide across the chart, repeat the word "two" or "five". When the feet are brought together to transfer the weight from one to the other, repeat the word "three" or "six" and you will have the proper count. The feet are always together on the counts "three" and "six". When making the step and slide use the toe, but when the foot is brought up on counts 3 . . . and . . . 6, place the foot upon the floor.

*Square waltz.—Part for lady.—Lesson II.*— "The turn:" In the turn the chart must be removed. Assume the same position as before: facing south. Step forward with the right foot . . . count 1. Now turn slightly toward the west, sliding the left foot across to the side (south) . . . count 2. Bring right foot up to the left foot, resting weight on the right foot . . . count 3. Step backward with left foot . . . count 4. Turn slightly toward the north, sliding the right foot across to the side (east) . . . count 5. Bring left foot up to the right foot, resting on the left foot . . . count 6. Step forward with the right foot . . . count 1. Turn slightly toward the east, sliding the left foot across to the side (north) . . . count 2. Bring right foot up to the left foot, resting weight on the right foot . . .

count 3. Step backward with the left foot . . . count 4. Turn slightly toward the south, sliding the right foot across to the side (west) . . . count 5. Bring left foot up to the right foot, resting weight on the left foot . . . count 6. The last movement bring back to the original position, facing south. Repeat these movements until they are familiar to you. Notice that feet are always together on counts 3 . . . and . . . 6. In practicing it is necessary at first, in learning the turn, to use the twelve counts, but as you become familiar with the steps, and the proper directions in which to turn, you will find that almost a complete turn can be made in six counts. This may be practiced as only six counts on the turn: stepping forward with the right foot, sliding the left foot across and bringing the feet together on count 3. The stepping backward with the left foot, sliding the right foot across and bringing the feet together on count 6.

*Square waltz.—Part for lady.—Lesson III.*—"The reverse step:" This step takes you over the floor in the dance. It is also called the guiding step, for with it the gentleman guides you over the floor. Place chart 1 (Fig. 5) on the floor, and place chart 2 (Fig. 6) about twelve inches south of it. The student faces the south throughout this step. Stand with toes together at numeral 4. Step forward to numeral 1 with right foot . . . count 1. Slide left foot across from numeral 1 to numeral 2 . . . count 2. Bring right foot up to numeral 2, resting weight on right foot . . . count 3. Step forward to numeral 5 with left foot . . . count 4. Slide right foot across from numeral 5 to numeral 6 . . . count 5. Bring left foot up to numeral 6, resting weight on left foot . . . count 6. Step with right foot backward to numeral 7 . . . count 1. Slide left foot across from numeral 7 to numeral 8 . . . count 2. Bring right foot up to numeral 8, resting weight on right foot . . . count 3. Step with left foot backward to numeral 3 . . . count 4. Slide right foot across from numeral 3 to numeral 4 . . . count 5. Bring left foot up to numeral 4, resting weight on left foot . . . count 6. Notice that by stepping forward once with the right foot to numeral 1 (count 1), sliding with left foot across to numeral 2 (count 2), bringing right foot to rest (count 3), stepping forward once with the left foot to numeral 5 (count 4), sliding with right foot across to numeral 6 (count 5), bringing left foot up to rest (count 6), that you have completed the six counts in the "reverse step" going forward. By stepping backward once with the right foot to numeral 7 (Fig. 6) (count 1,) sliding with the left foot across to numeral 8 (count 2), bringing right foot up to rest (count 3), stepping backward once with the left foot to numeral 3 (count 4), sliding with right foot across to numeral 4 (count 5), bringing left foot up to rest (count 6,) you have completed the "reverse step" going backward.

*Square waltz. — Part for lady. — Lesson IV.*—1st. Turn with partner . . . 6 counts. 2d. Forward (reverse step) . . . 6 counts. 3d. Backward (reverse step) . . . 6 counts, and repeat. In other words the lady's part is: turn . . . forward . . . backward.

*Square waltz.—Part for gentleman.—Lesson I.*—Danced to ¾ time. Place chart No. 1, (Fig. 7) flat upon floor. Stand with heels together within four inches of numeral 4, facing the north, the arrow pointing between the heels. Step backward to numeral 1 with the left foot, keeping within four inches of the chart . . . count 1. Lift right foot up and slide with the right foot across from numeral 1 to numeral 2 (Fig. 7) . . . count 2. Bring left foot up to numeral 2, resting weight on left foot . . . count 3. Step forward with right foot to numeral 3 . . . count 4. Lift left foot up and slide with left foot across from numeral 3 to numeral 4 . . . count 5. Bring right foot up to numeral 4 and rest . . . count 6. Repeat above until proficient. When practicing these steps, always keep four inches outside of the chart with the right and left foot; later on, the length of the step can be made to suit the convenience of the dancer. Count by saying:

1 . . . 2 . . . 3   4 . . . 5 . . . 6.

When making the step repeat the word "one" or "four". When making the slide across the chart, repeat the word "two" or "five". When the feet are brought together to transfer the weight from one to the other, repeat the word "three" or "six", and you will have the proper count. Notice that the feet are always together on the counts three . . . and . . . six. When making the step and slide use the toe, but when the foot is brought up on counts 3 and 6, place foot upon the floor.

*Square waltz.—Part for gentleman.—Lesson II.*—"The turn:" On the turn the chart must be removed. Assume the same position as in prior Lesson I, facing the north. Step backward with left foot . . . count 1. Now turn slightly toward the east, sliding the right foot across to the side (south) . . . count 2. Bring left foot up to the right, resting weight on the left foot . . . count 3. Step forward with the right foot . . . count 4. Turn slightly toward the south, sliding the left foot across to the side (east) . . . count 5. Bring right foot up to the left foot, resting weight on the right foot . . . count 6. Step backward with the left foot . . . count 1. Turn slightly toward the west, sliding the right foot across to the side (north) . . . count 2. Bring left foot up to the right foot, resting weight on the left foot . . . count 3.

Step forward with the right foot . . . count 4. Turn slightly toward the north, sliding the left foot across to the side (west) . . . count 5. Bring right foot up to the left foot, resting weight on the right foot . . . count 6. This brings you to the original position: facing north. Notice that the feet are always together on counts 3 . . . and . . . 6. Later on this lesson should be practiced as only six counts: stepping backward with the left foot, sliding the right foot across and bringing the feet together on count 3. The stepping forward with the right foot, sliding the left foot across, and bringing the feet together on count 6.

*Square waltz.—Part for gentleman.—Lesson III.*—"The reverse step:" This takes you over the floor in the dance. It is also called the guiding step, for with it the gentleman guides his partner over the floor. Place chart No. 1 (Fig. 7) on the floor as in Lesson I, and place chart No. 2 (Fig. 8) about twelve inches south of it. You should face the north throughout this step. Stand with heels together at numeral 4 (Fig. 7). Step backward to numeral 1 with left foot . . . count 1. Slide right foot across from numeral 1 to numeral 2 . . . count 2. Bring left foot up to numeral 2, resting weight on left foot . . . count 3. Step backward to numeral 5 with right foot . . . count 4. Slide left foot across from numeral 5 to numeral 6 . . . count 5. Bring right foot up to numeral 6, resting weight on right foot . . . count 6. Step forward with left foot to numeral 7 . . . count 1. Slide right foot across from numeral 7 to numeral 8 . . . count 2. Bring left foot up to numeral 8, resting weight on left foot . . . count 3. Step forward with right foot to numeral 3 . . . count 4. Slide left foot across from numeral 3 to numeral 4 . . . count 5. Bring right foot up to numeral 4, resting weight on right foot . . . count 6. Repeat until proficient. Notice that by stepping backward once with the left foot to numeral 1 (count 1), sliding with right foot across to numeral 2 (count 2), bringing left foot up to rest (count 3), stepping backward once with the right foot to numeral 5 (count 4), sliding with left foot across to numeral 6 (count 5), bringing right foot up to rest (count 6), that you have completed the six counts in the "reverse step" going backwards. By stepping forward once with the left foot to numeral 7 (count 1), sliding with the right foot across to numeral 8 (count 2), bringing left foot up to rest (count 3), stepping forward once with the right foot to numeral 3 (count 4), sliding with left foot across to numeral 4 (count 5), bringing right foot up to rest (count 6), you have completed the "reverse step" going forward.

*Square waltz.—Part for gentleman.—Lesson IV.*—1st. Turn with partner . . . 6 counts. 2d. Backward (reverse step) . . . 6 counts. 3d. Forward (reverse step) . . . 6 counts, and repeat. In other words, the gentleman's part is: turn . . . backward . . . forward. The gentleman must at all times go backward on the reverse step first before he sends the lady backward.

Having now fully shown and described my invention, what I claim and desire to secure by Letters Patent of the United States, is—

1. That improvement in the art of dancing which consists of a series of charts having four corners, a numeral printed in each corner portion of each chart, a word printed in each corner of each chart and designating either "heels" or "toes" a printed arrow pointing to each of said words, means for denoting the position each chart is to occupy with relation to the points of the compass, and a number printed in the central portion of each chart, all substantially as described and set forth.

2. That improvement in the art of dancing comprising a series of charts for self instruction in "square two-step" and "square waltz" dances, means for denoting the position the several charts are to occupy, means for denoting the positions for the students heels and toes, and a series of numerals arranged in progressive succession printed on each chart, all substantially as set forth.

3. That improvement in the art of teaching dancing which comprises a series of eight oblong charts to be placed upon the floor, a numeral printed near each corner of each chart, each of said corners also containing a numeral different from that of the other three corners, two of the corners of each chart having printed thereon the words "heels" and the other two corners of each chart having printed thereon the words "toes", an indicator pointing to each of said words, means for denoting the direction the top of the charts are to be directed, and a number printed on the central portion of each chart, all substantially as shown and described and for the purposes set forth.

In testimony whereof I have hereunto subscribed my name to this specification in the presence of two subscribing witnesses.

GERTRUDE KOLP.

Witnesses:
R. E. RANDLE,
ROBERT W. RANDLE.